United States Patent

Hillel

[11] 4,027,428
[45] June 7, 1977

[54] METHOD AND APPARATUS FOR CONSERVING SOIL WATER

[76] Inventor: Daniel I. Hillel, Rte. 1, Box 191-A, Barboursville, Va. 22923

[22] Filed: July 1, 1975

[21] Appl. No.: 592,246

[52] U.S. Cl. .................................. 47/58; 404/91; 47/1.42; 47/DIG. 10
[51] Int. Cl.$^2$ ........................................ A01N 7/02
[58] Field of Search .............. 47/DIG. 10, 9, 58, 1, 47/1.42; 172/32–33, 72, 67, 642, 758, 193–194, 203, 720; 404/90–92; 111/1, 6

[56] References Cited

UNITED STATES PATENTS

| | | | |
|---|---|---|---|
| 1,882,377 | 10/1932 | Whittelsey | 47/9 |
| 2,060,688 | 11/1936 | Pryor et al. | 172/33 |
| 2,351,388 | 6/1944 | Baxter | 172/720 |
| 2,394,017 | 2/1946 | Seaman | 404/91 X |
| 2,563,926 | 8/1951 | Elliott et al. | 47/1.42 |
| 2,776,532 | 1/1957 | Buchholz | 47/1 X |
| 2,778,809 | 1/1957 | Mussell et al. | 47/1 X |
| 2,783,698 | 3/1957 | Bambi | 47/58 X |
| 2,884,742 | 5/1959 | Moore et al. | 47/58 |
| 2,961,799 | 11/1960 | Coe | 47/9 |
| 2,986,841 | 6/1961 | MacDonald | 47/1.42 |

OTHER PUBLICATIONS

The Condensed Chem. Dictionary, 5th Ed., 1956, Reinhold Publ. Corp., N.Y., p. 981.
Mulch Farming, Cruz, Philippine Ag. Eng. Journ., No. 3, 1953, pp. 148, 151.
The Yearbook of Agriculture, 1957, USDA, Wash. D.C., pp. 312–313.

Primary Examiner—Robert E. Bagwill

[57] ABSTRACT

Natural soil is formed into clods ranging in size from a minimum dimension of about 5 mm to a maximum dimension of about 10 cm, and a hydrophobic agent is applied to the surface of the clods to increase the contact angle of water on the exposed grain surfaces of the clods to an angle greater than 90°, which makes the clods water repellent. The clods thus treated are employed to form the top layer of soil. The treated clods conserve soil water by allowing maximal intake of water and by constituting a barrier which reduces water evaporation. Such soil water conservation together with other advantages enable farming on land in regions which could never successfully be farmed before.

An apparatus for forming and treating the clods has a lifting device for lifting the top layer of soil of a field to a screening device for breaking up the soil to have a maximum dimension of about 10 cm and to drop the broken up soil back to the field. A chamber having an open bottom surrounds the screening device, and nozzles direct a spray of liquid hydrophobic agent into the chamber to coat the clods. Alternatively, a blower may direct a powdered hydrophobic agent into the chamber. The screening device may be an apertured continuous belt, continuously moving and vibrating between a pair of horizontal axes, the soil being directed by the lifting device to the upper course of the belt.

17 Claims, 14 Drawing Figures

FIG. IA

CONTACT ANGLE OF WATER TO SURFACE MEASURED FROM THE CONTACT SURFACE INSIDE THE WATER DROP TO THE TANGENT FROM THE POINT OF EDGE CONTACT WITH THE SURFACE ALONG THE DROP SURFACE

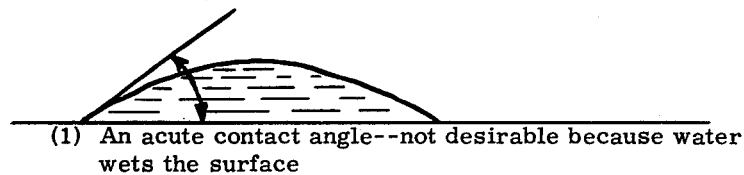

(1) An acute contact angle--not desirable because water wets the surface

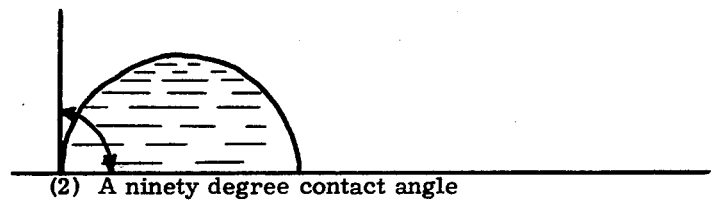

(2) A ninety degree contact angle

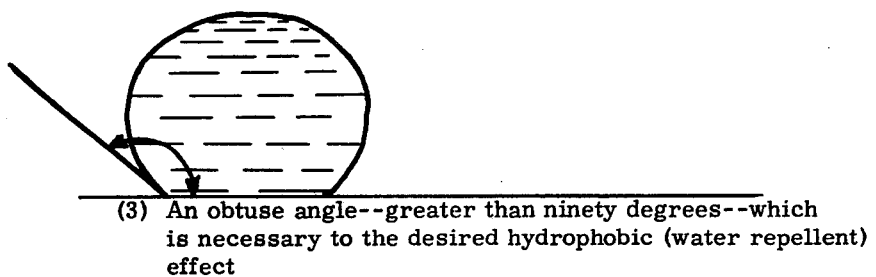

(3) An obtuse angle--greater than ninety degrees--which is necessary to the desired hydrophobic (water repellent) effect

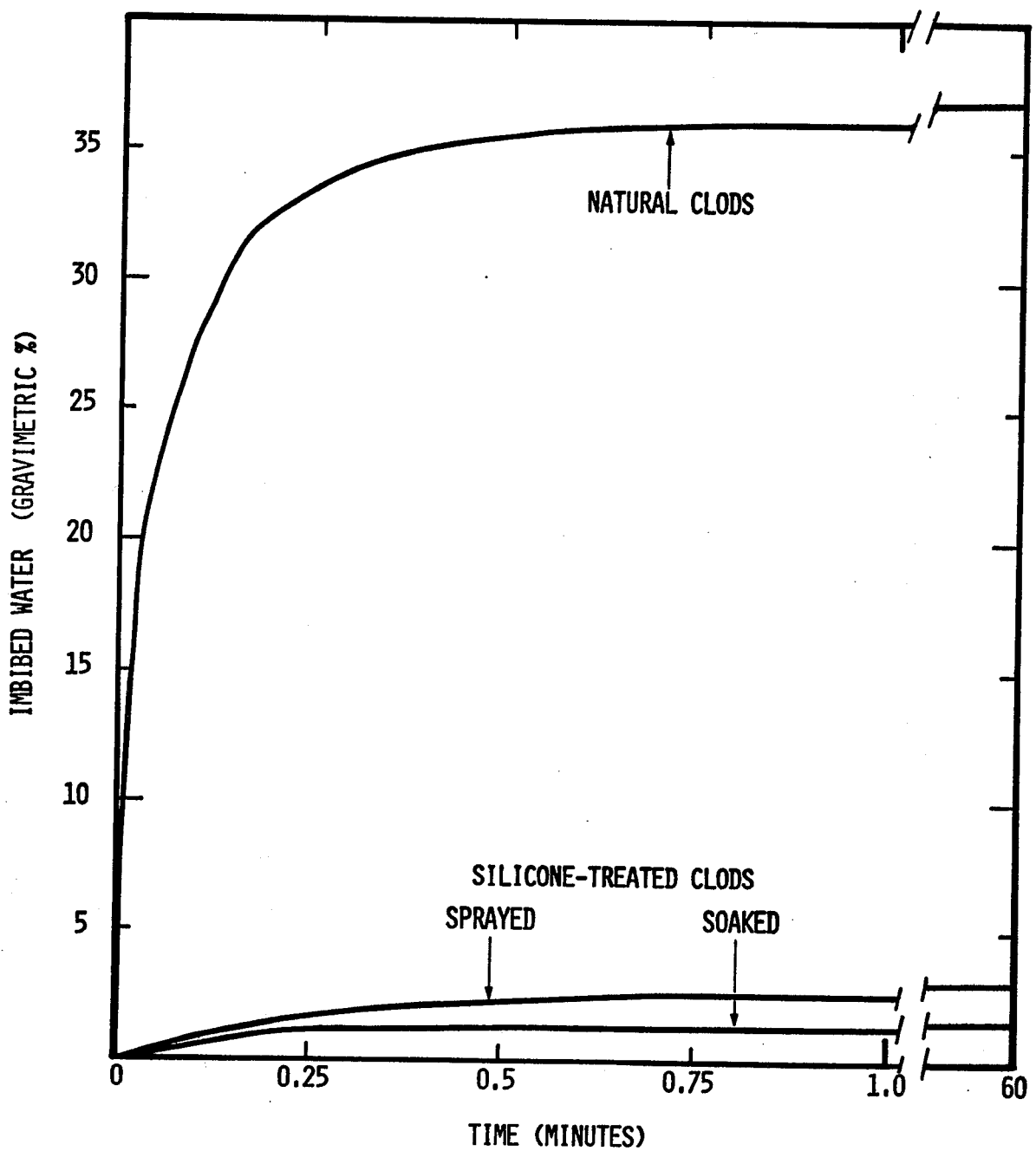
FIG. 7 RATES OF WETTING OF CLODS IMMERSED IN FREE WATER.

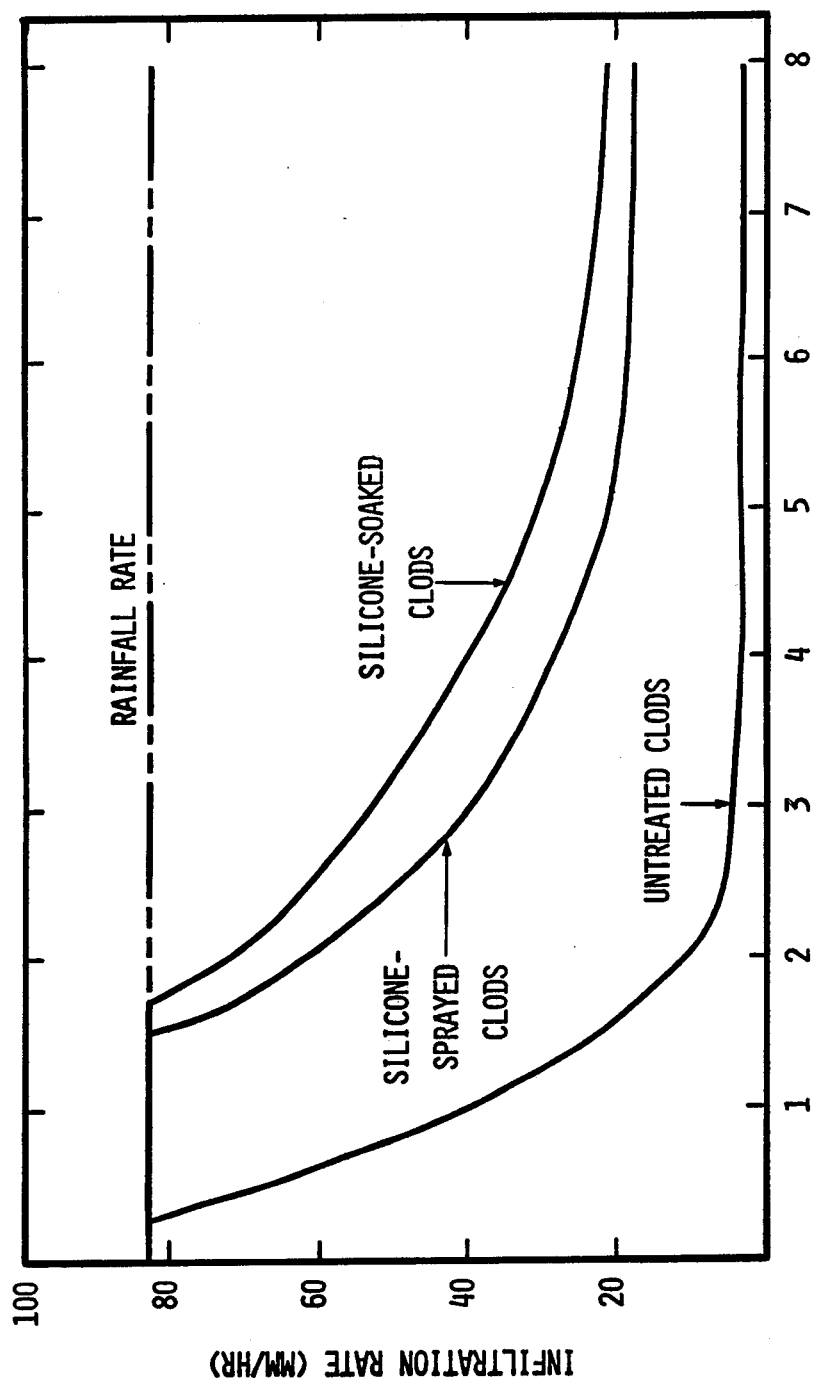
FIG. 8  RATES OF INFILTRATION INTO SILT-LOAM SOIL PLOTS COVERED WITH 6 CM THICK LAYERS OF VARIOUSLY-TREATED AGGREGATES (5-20 MM DIAMETER RANGE). THE PLOTS WERE SUBJECTED TO A SIMULATED RAIN OF 82.3 MM/HOUR FOR 8 HOURS.

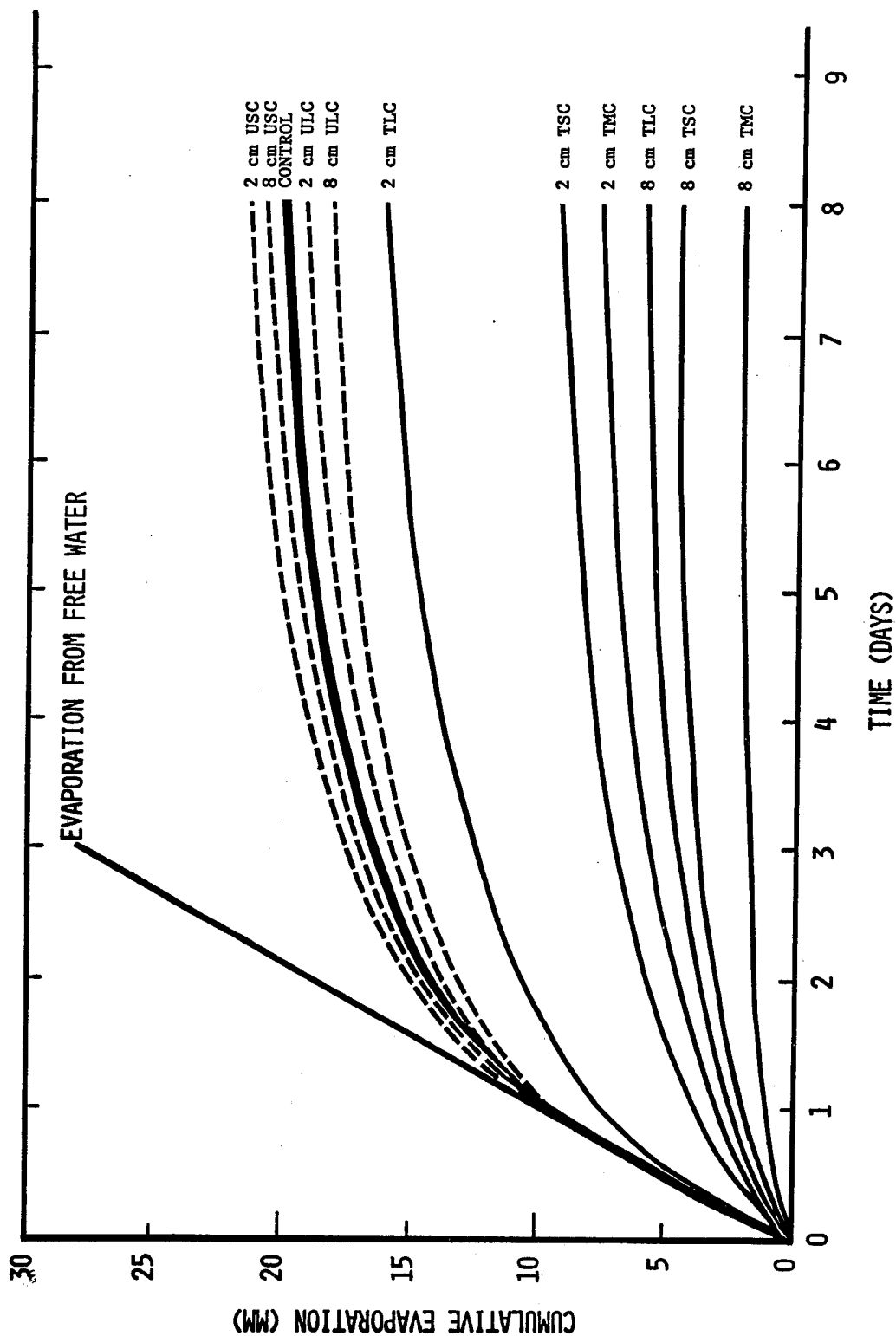
FIG. 9 EVAPORATION FROM COLUMNS OF SILT LOAM SOIL COVERED WITH 2 AND 8 CM LAYERS OF CLODS OF VARIOUS SIZE RANGES AND TREATMENTS: TSC = SILICONE-TREATED SMALL CLODS (DIAMETER RANGE 0.2-0.5 MM); TMC = TREATED MEDIUM-SIZE CLODS (0.5-2 MM); TLC = TREATED LARGE CLODS (5-20 MM). USC, ULC = UNTREATED SMALL & LARGE CLODS.

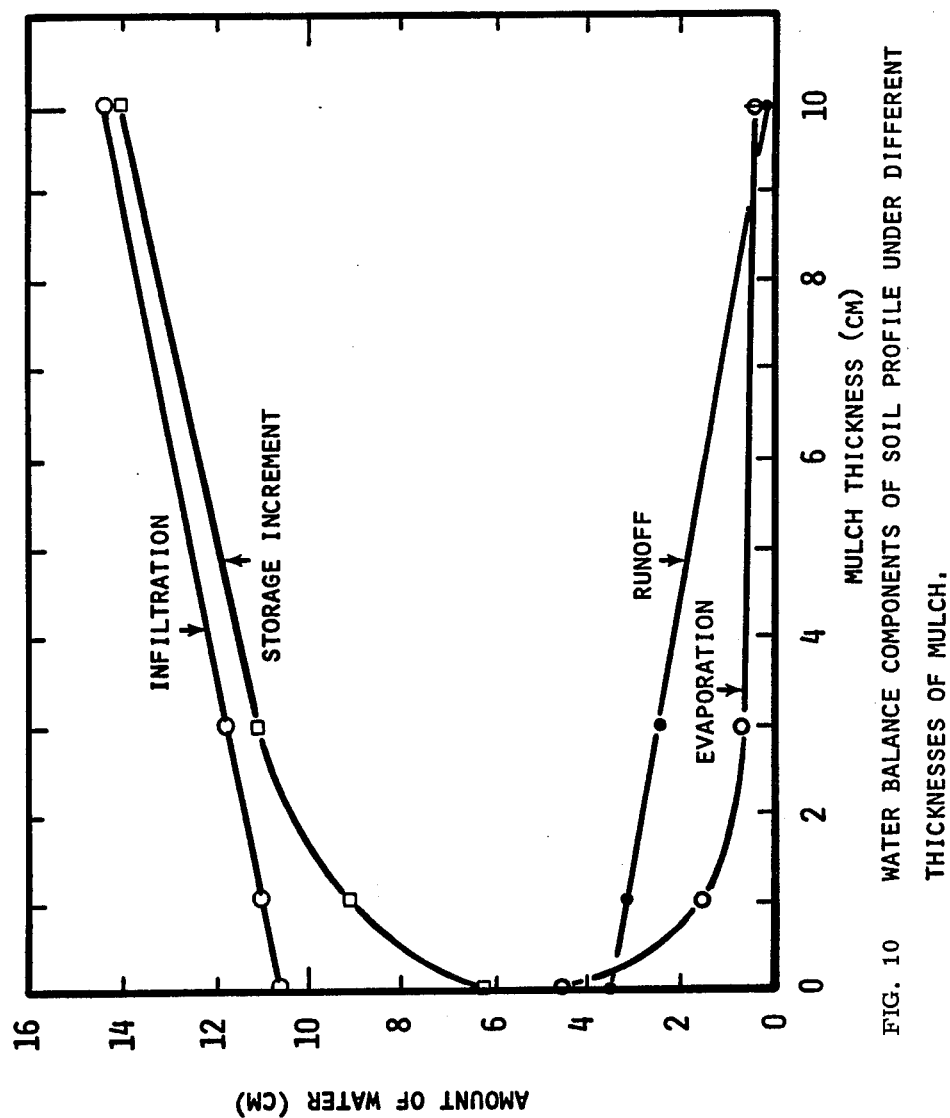
FIG. 10  WATER BALANCE COMPONENTS OF SOIL PROFILE UNDER DIFFERENT THICKNESSES OF MULCH.

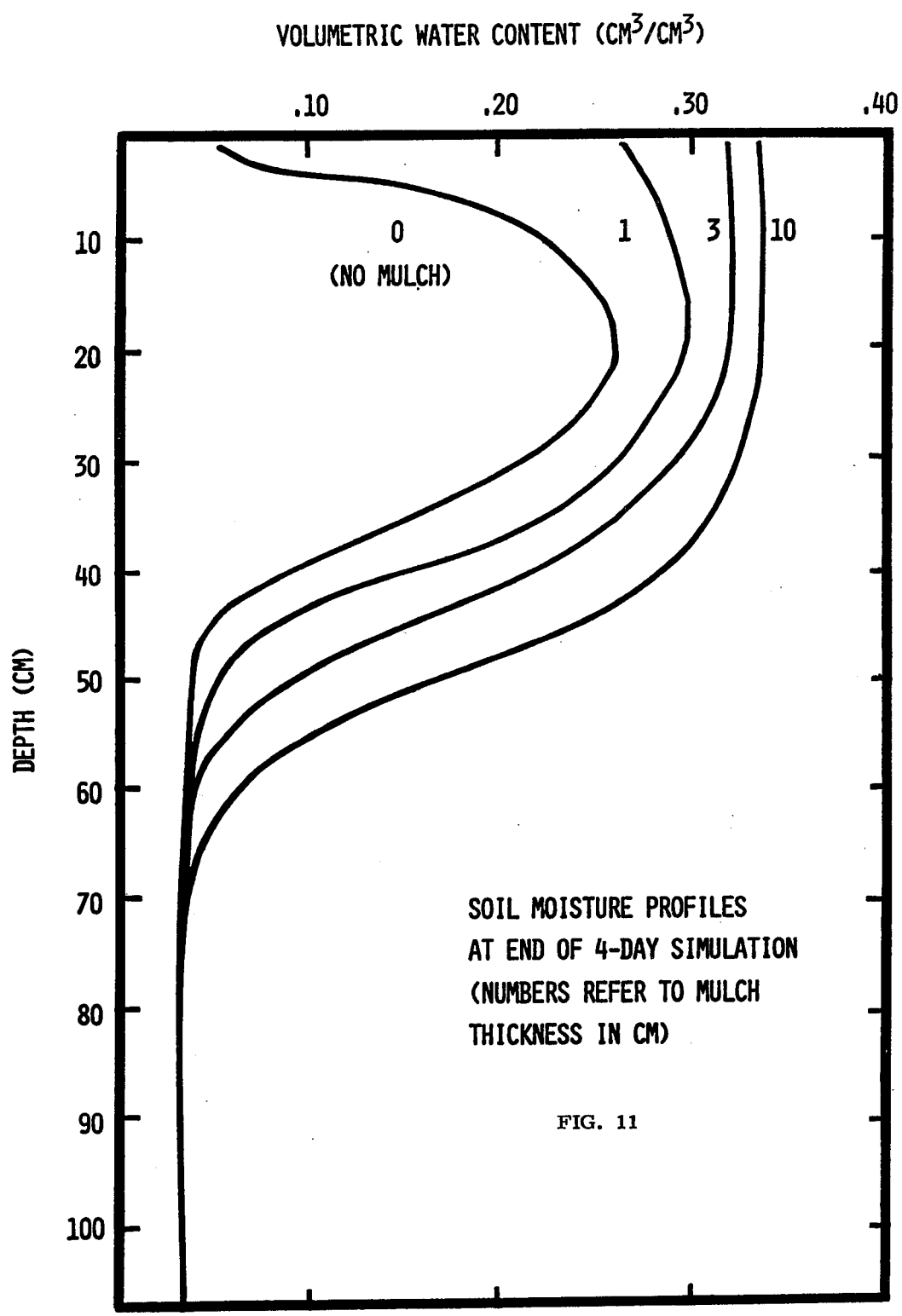

METHOD AND APPARATUS FOR CONSERVING SOIL WATER

This invention relates to agriculture and more particularly to the conservation of soil moisture, by combined mechanical and chemical treatment of the soil top layer.

The principal object of the invention is to enable farming on land in regions which could never successfully be farmed before, especially in semi-arid regions.

The increasingly acute shortage of food already experienced by some nations has focused attention upon the urgent task of expanding food production to alleviate existing hunger and to keep pace with expected population growth. The problem is especially acute in semi-arid regions where so much of mankind is concentrated. In such regions, water generally constitutes the limiting factor in crop production, as the supply of water by natural precipitation is meager and sporadic even while the climatically-induced requirement for water is high and practically incessant.

Unfortunately, some of the rain reaching the soil surface may fail to infiltrate and may run downslope in overland flow ("runoff"), which also entails the hazard of erosion. Moreover, a considerable amount of the water which does infiltrate into the soil may subsequently be lost through direct evaporation or through extraction and transpiration by weeds. In rain-fed farming, such losses can deprive the crops of a major portion of the water supply and might result in crop failure. In irrigated farming, such losses reduce the efficiency of water use.

Of particular importance is the soil surface-zone, where the complex processes of infiltration, runoff, erosion, evaporation, and germination takes place. Since the soil surface is amenable to various control measures, it is an essential task of agricultural research to develop techniques for controlling the dynamic balance, storage, and utilization of soil moisture most effectively from the agricultural and environmental points of view.

Natural soils thus exhibit the following deficiencies:

1. The surface clods collapse and slake-down as they absorb water, particularly under the beating action of raindrops, to form a muddy layer at the surface which clogs and seals the surface cavities.

2. Natural soil grains readily enter into a suspension in water and are easily carried downslope by flowing water, which has the effect of scouring and eroding the surface and of causing sedimentation and pollution of streams, lakes and reservoirs.

3. Natural soil surfaces contact and cake as they dry from saturation to form a dense and hard crust which subsequently inhibits germination and seedling emergence of crop seeds planted under the surface.

4. Natural soil surfaces allow the loss of large quantities of water by direct evaporation after each rain or irrigation, particularly if the caked surface tends to crack as it desiccates.

5. Natural soil surfaces permit the germination of numerous weed seeds, which are generally present at or very near the soil surface, after each rain or irrigation.

6. Repeated cultivation of natural soil surfaces, often necessary to eradicate weeds and to reopen the crusted surface tends to pulverize the soil into dust so it becomes vulnerable to wind erosion.

7. Natural soil surfaces inhibit gas exchange and soil aeration as they seal and saturate, thus inhibiting the respiration of soil organisms and of crop roots, which might then suffer from lack of oxygen.

As employed herein, the term "grain" refers to a single crystal, or a fragment of rock, and the term "clod" refers to a combination or aggregation of grains, held together by cohesive and adhesive forces. See "Soil and Water" by Professor Daniel Hillel (the applicant), (Academic Press, New York 1971), pp. 24-26.

It has been proposed to reduce evaporation and protect the soil surface by mulching over the soil with an assortment of foreign materials, such as straw, paper, asphalt, plastic sheeting and gravel.

Such materials are in themselves expensive, or are costly to convey to the field and spread over it. Often, as in the case of paper, they quickly lose their effectiveness, or, as in the case of gravel, they cannot easily be removed and may become a hindrance as it becomes desirable to change the pattern of soil utilization.

Such materials may themselves be absorbent and might thus inhibit the penetration into the soil of light rains. As they retain water at the surface, they might also increase, rather than reduce, the total evaporation.

Other materials previously proposed (e.g., asphalt) may be, or leave residues, which are toxic and environmentally damaging.

It has also been proposed to stabilize soil clods by the addition of binding agents such as organic polymers ("soil conditioners"), but such materials are generally needed in large quantities (0.02% to 0.2% of the treated soil mass) so they are prohibitive in cost in actual practice.

It is therefore an object of this invention to provide a method and apparatus for conserving soil moisture that overcomes the disadvantages of the above prior techniques.

A further object of the invention is to provide a method and apparatus for conserving soil moisture whereby the soil may be readily and economically treated in the field.

Briefly stated, in accordance with the present invention, it has been discovered that effective stabilization and waterproofing of soil clods can be achieved with very small amounts of hydrophobic agents; i.e., any of a class of waterproofing agents, particularly of the organo-silicone type.

The treatment can be applied over the entire soil surface continuously, as in fields in which no plant growth is desired (e.g., infiltration and water-rechange areas, or fire-control strips), or over the major portion of the area (as in orchards or the between-row zones of row-cropped fields) or over narrow strips (such as seeding rows, where the desired localized effect is to prevent crusting).

In the process in accordance with the invention, the soil to be treated is formed, for example by a breaking-up process, into clods, with at least 90% of the mass of the clods ranging in size from 5 mm in minimum dimension to 10 cm in maximum dimension. A liquid hydrophobic agent is applied to these clods to treat the exposed grain surfaces, preferably to a depth of at least one millimeter, in order to increase the contact angle of water on the grain surface to an angle greater than 90°. That makes the clods water repellent. This coating may be effected, for example, by spraying the hydrophobic agent on the clods. The thus coated clods are employed to form the top soil layer, to a depth from 2 to 15 centimeters.

Alternatively, the clods may be dusted with a powdered hydrophobic agent, whereby natural or artificial moisture thereafter affects the coating of the grain surfaces in the above manner.

The hydrophobic materials with which the soil can be treated include any of a class known as "water proofing agents" applicable either in solution or emulsified form, either in organic solvent or an aqueous medium, or in powdered form.

The soil which may be treated according to the invention include loamy sands, sandy loams, silt loams, clay loams, and clays, and mixtures thereof, either in the open field or in greenhouses or growth chambers; or any soils which normally can be formed into clods, even if not heretofore considered suitable for agriculture.

The areas to which this invention applies include actual or potential agricultural areas everywhere, in the humid, sub-humid, semi-humid, semi-arid, and arid regions. The greatest advantages, however, are to be obtained in sub-humid or semi-arid and arid regions, either under rainfed (dryland) farming or under irrigation, where soil moisture conservation can be crucial.

The treatment of the soil in accordance with the invention provides the following advantages:

1. The treated clods remain stable as they do not imbibe water, do not collapse, do not seal the surface, and their particles do not enter into suspension and migrate downslope in the processes of erosion and sedimentation.

2. The treated clods resist wind erosion, as they maintain their size, being too large to be picked up by the wind.

3. The treated clods maintain an open soil surface, allowing maximal intake of water directly into the deeper layers of the soil.

4. The open treated soil surface allows free exchange of gases and soil aeration.

5. The treated clods form a protective mulch which reduces evaporation by constituting a barrier to the upward capillary flow of liquid water and to the out-diffusion of water vapor.

6. The treated clods, by remaining dry, inhibit the germination of weed seeds, which are normally adapted to germination from shallow depths and which take water from the crop seeds and seedlings.

7. The loose assemblage of treated clods readily allows the germination and emergence of seedlings of crop seeds, normally planted under the surface.

The surprising result of the invention is to enable farming on land in regions which could not successfully be farmed before, especially in semi-arid regions.

In a further embodiment of the invention, an apparatus is provided having means, such as a blade, for cutting and lifting the top layer of soil in a field and conveying that soil to a forming device for forming clods within the desired dimensions. The forming device is enclosed in a chamber, and means are provided for directing a spray of liquid hydrophobic agent into the chamber to coat the clods before they are returned to form a top layer of water-repellent clods in the field. Alternatively, the hydrophobic agent may be blown into the chamber in dust form, to coat the clods.

Advantageously, the forming device may comprise an apertured endless belt mounted to continuously or intermittently rotate between a pair of horizontal axes, with the soil being directed to the top course of the belt to effect a double screening effect as the soil drops through the upper and lower courses of the apertured belt. The bottom of the chamber may be open, so that the clods coated in the chamber drop to the ground with the coarsest clods on top. Means are provided for further agitating or vibrating the belt, to aid the breaking up of the clods.

This apparatus enables the simple treatment of soil of a field in a minimum time and with a minimum cost, since the entire treatment may be effected with a single pass of the apparatus over the area to be treated.

In order that the invention will be more clearly understood, and other objects, features and advantages discerned, it will be disclosed in greater detail with reference to the accompanying drawings, wherein:

FIG. 1A is a diagram showing water contact angle measurement;

FIG. 7 is a graph illustrating the comparative imbibing of water by natural treated clods, as a function of time;

FIG. 8 is a graph illustrating the infiltration rate of water through natural treated clods;

FIG. 9 is a graph illustrating cumulative evaporation from soil covered by natural and treated clods;

FIG. 10 is a graph illustrating water balance components of soil profile, with a mulch of treated soil clods, as a function of mulch thickness;

FIG. 11 is a graph of soil moisture profiles, comparing unmulched soil and soil having a mulch of clods treated in accordance with the invention;

Figure 1:
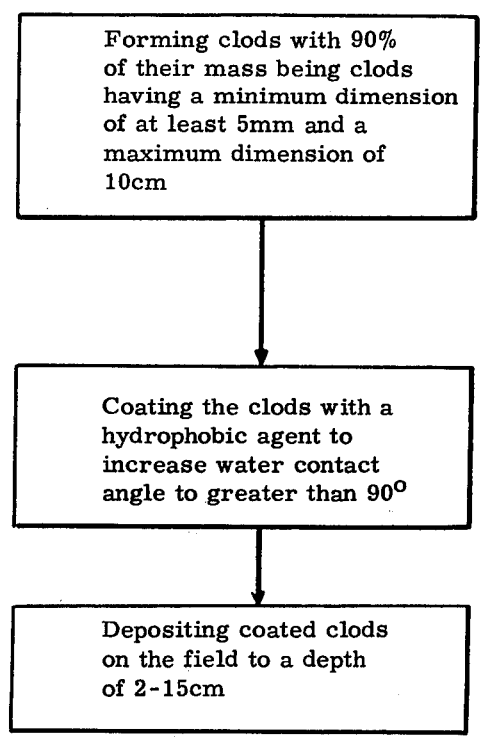
FIG. 1 is a simplified flow diagram of the process of the invention.
Figure 2:
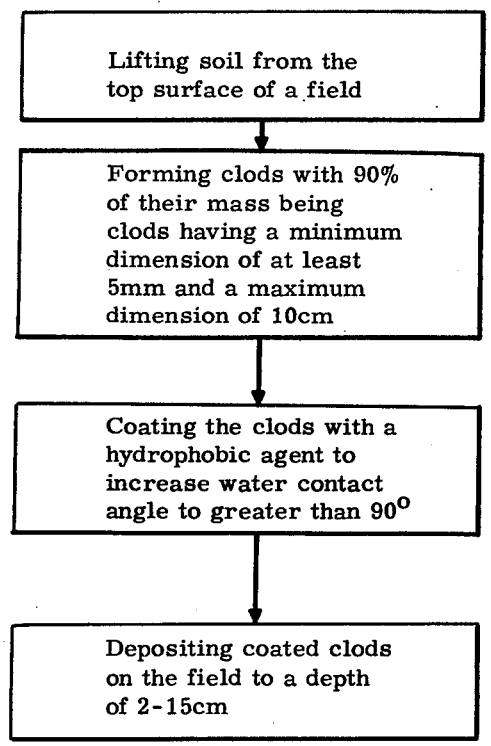
FIG. 2 is a simplified flow diagram of a modification of the process of FIG. 1.

Referring now to the drawings, FIG. 1 illustrates in simplified form the process in accordance with the invention. As illustrated, the soil is first formed into clods, 90% of the mass of which are clods having a minimum dimension of at least 5 millimeters and a maximum dimension of ten centimeters. This forming process may be effected, for example, by breaking up the top layer of soil in a field. For breaking up the soil most effectively, the top layer should be barely moist, having an average suction value exceeding ½ bar but not exceeding 100 bars. If the soil is too dry, it will tend to form an excessive quantity of dust, and thereby reduce the effectiveness of the process. If it is too wet, it will deform plastically and puddle rather than break into distinct clods.

The thus-formed clods are then treated with a hydrophobic agent in order to coat the exposed grain surfaces of each clod with the hydrophobic agent, to increase the contact angle of water on the grain surfaces to an angle greater than 90°. (FIG. 1a shows water contact angle measurement.) The hydrophobic agent can include any of a class of material known as "water proofing agents" applicable either in solution or emulsified form, either in an organic solvent such as kerosene, or an aqueous medium.

As an example, it has been found that emulsions or solutions of sodium methyl siliconate or silanolate, 10% by weight in water or 5% by weight in kerosene, are suitable materials for use in accordance with the invention. An example in General Electric Silicone Resin DF 144 (5.5% silicone in petroleum distillates). Such liquid materials may be sprayed on the formed clods. Emulsions of dimethyl siliconate, silanes and dimethyl siloxane may also be employed. Dow Corning XZ8–5079, an anionic emulsion of dimethylsilicone, and Dow Corning No. 772, a water-soluble sodium methyl siliconate solution, have also been found to be satisfactory for the purpose of the invention. Suitable materials thus may be stated to be any of the class of materials known as "hydrophobic" or "waterproofing" agents, such as but not limited to the organo-silicones. In general, it has been found that waterproofing agents adapted for use with concrete are also useful in the present invention, since, in the mineralogical and physico-chemical sense, concrete is similar to soil.

The coating of the clods need not fill the micropores of the clods, as long as it increases the contact angle of water on the grain surfaces as above noted. If desired, however, even more effective soil-water conservation may be obtained if the micropores are filled. For this purpose, a latex, wax, or plastic polymer emulsion may be added to the hydrophobic agent to enhance the effect.

The "contact angle" of water on the grain surfaces may be explained as follows (see FIG. 1A): If a drop of water is placed on a dry surface, the water will usually displace the gas which covered the surface of the solid and spread over that surface to a certain extent. Where the spreading will cease and the edge of the drop will come to rest, its interface with the gas will form a typical angle with its interface with the solid. This angle is known as the "contact angle". This angle is more fully described, for example, in applicant's book, "Soil and Water," supra, pp. 40–41.

In the coating process, it is preferred that the hydrophobic agent penetrates into the periphery of each clod at least one millimeter.

The amount of active material needed to hydrophobe soil particle surfaces in accordance with the invention depends on each soil's specific surface area, defined as the total surface area per unit mass of particles. (Chapter 1 of applicant's "Soil and Water.") Various agricultural soils differ widely from each other in specific surface area, ranging from about 5 to 500 square meters per gram. The amounts of active material needed can be smaller than 5 kg per 1000 m$^2$ of field surface, but may range to 20 or more depending on soil specific surface area.

As an example:
If molecular weight of active material = 200 and the monolayer area covered per molecule = 300 A$^2$ = 3 ×10$^{-18}$ m$^2$, 1 kg of active material covers $$1000/200 \times 6 \times 10^{23} \times 3 \times 10^{-18} \cong 10^7 \text{ m}^2 \text{ of treated grain surfaces.}$$

If effective specific surface area of soil = 20 m$^2$ per gram and soil bulk density = 1.2 gm per cm$^3$ = 1200 kg/m$^3$ (area of 1 acre = 4000 m$^2$), a mass of layer 5 cm deep = 0.05 × 4000 × 1200 = 240,000 kg/acre. If only the outer surface of clods treated, i.e., about 4% of soil mass, the treated mass $\cong$ 10,000 kg then, the net area of treated grain surfaces = 10,000 × 1000 × 20 = 2 × 10$^8$ m$^2$. Therefore, amount of active material needed = 2 × 10$^8$/10$^7$ = 20 kg. If concentration of solution is 25%, sprayable material needed per acre = 20 × 100/25 = 80 kg = 80 liters $\cong$ 20 gallons Stabilization of surface-zone clods in accordance with the invention is achieved by preventing the imbibition of water and compression of air and weakening of soil structure, rather than by bonding the particles internally in the clod, which experience shows to be excessively expensive. Prevention of water absorption by clods is not achieved necessarily by coating the clod surfaces by a sealing cover (such as a wax coat) but primarily by the physico-chemical effect of transforming naturally-hydrophobic mineral particles into a hydrophobic state through the molecular adsorption of hydrophobic chemical agents. This transforms adsorptive and capillary attraction to repulsion.

Alternatively, the hydrophobic agent may be in powdered form, in which case, the coating step comprises dusting the clods with the agent.

Following the coating step, the treated clods are deposited on the ground to form the top soil layer, with a depth between 2 centimeters and 15 centimeters.

Figure 12:
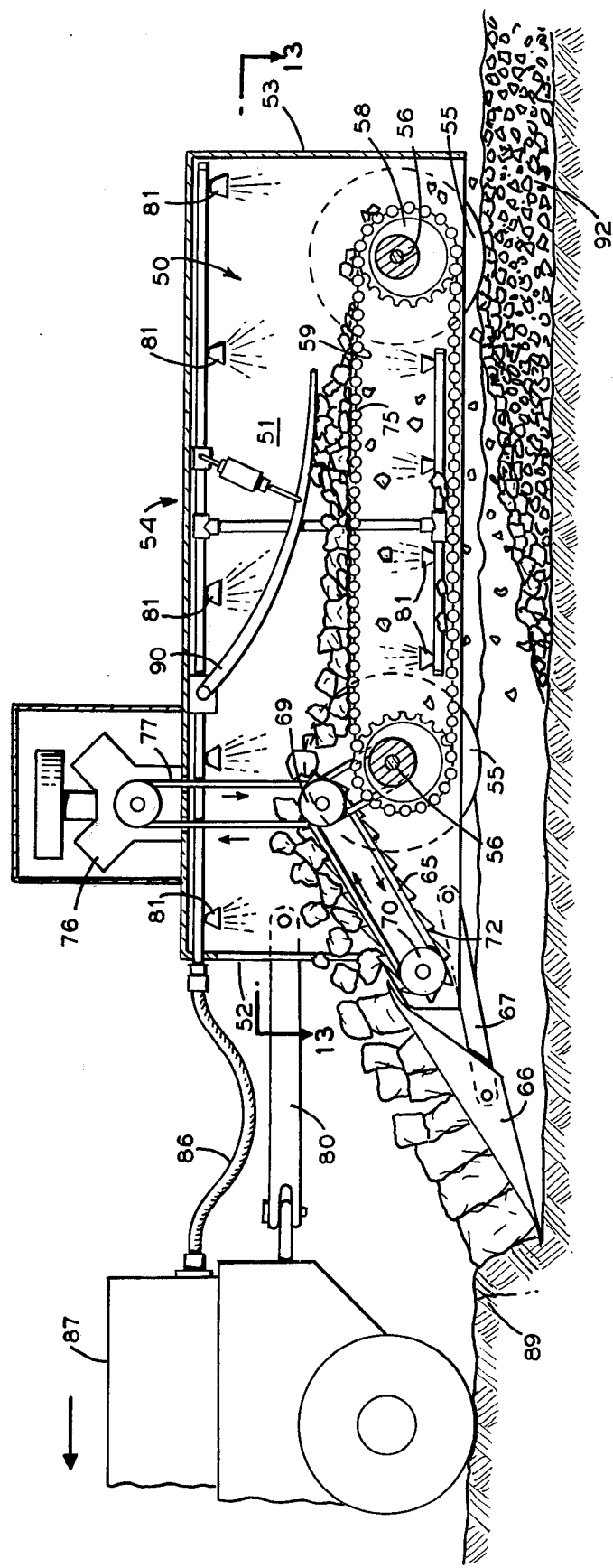
FIG. 12 is a simplified sectional view of a treating apparatus (clod mulcher) in accordance with the invention.
Figure 13:
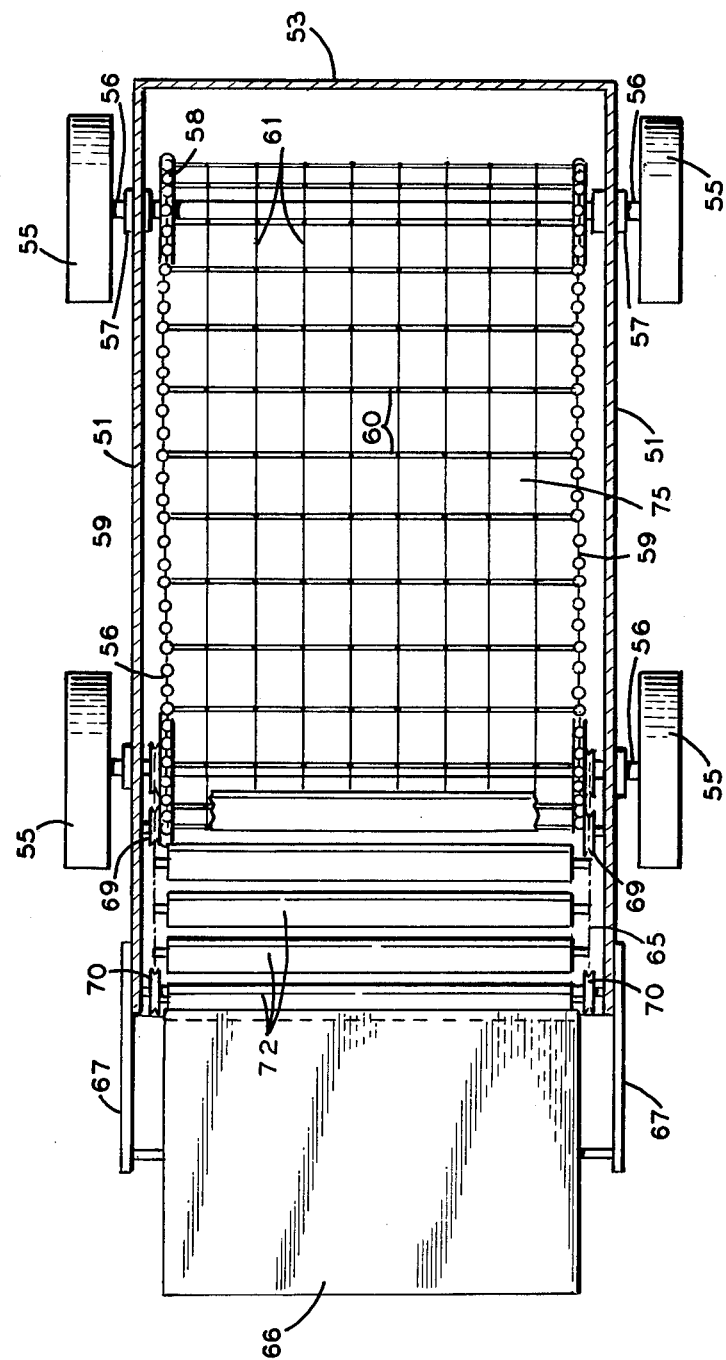
FIG. 13 is a top view of the apparatus of FIG. 12.

While the clods may be formed at the ground level, for example by employing a cultivating process, it has been found that it is difficult to control the sizes of the clods and obtain complete peripheral hydrophobization, as desired, by this technique. Therefore, in accordance with the preferred process, as illustrated in FIGS. 12 and 13, the top layer of soil is first lifted from a field, to permit the formation of the clods in a suitable apparatus above the level of the ground.

Natural mineral surfaces are typically hydrophilic (wettable) in that they exhibit an acute angle of contact with water. Hence a porous assemblage of dry mineral particles normally sorbs water spontaneously by capillary attraction. The capillary action of water is discussed in applicant's "Soil and Water", at pages 42–43. On the other hand, particle surfaces which adsorb a water repellent coating are characterized by an obtuse wetting angle, and hence narrow pores between such particles exhibit capillary repulsion and resist the entry of water.

While hydrophobic materials have been employed to help seal a pre-compacted soil surface against infiltration of rain in order to induce runoff from uncultivated barren slopes in desert regions, a practice called "water harvesting", the same materials used in accordance with the present invention can produce the opposite effect of increasing infiltration in cultivated agricultural fields, since the soil surface is broken into clods and the clods are treated to make them individually water-repellent.

Natural (hydrophilic) clods are generally unstable and vulnerable to destruction by water. As they wet, particularly under the beating action of raindrops, the exposed clods tend to slake or collapse and their soil particles disperse in water to form a muddy suspension which often clogs the cavities between the clods, thus sealing the surface and forming a "crust". Pretreatment of the clods with hydrophobic agents keeps the clods from slaking-down in water and from clogging the surface cavities, thus this treatment can help to maintain a high infiltration rate for maximal absorption of rain.

Figure 4:
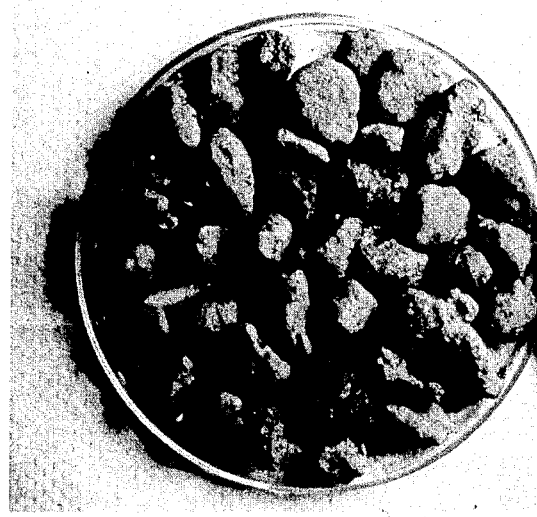
FIG. 4 is a photograph of soil clods treated in accordance with the invention during wetting.
Figure 3:
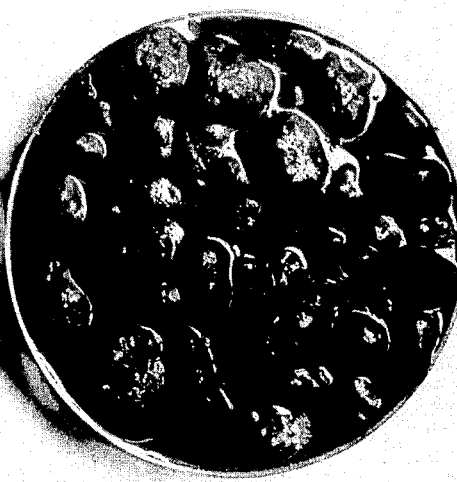
FIG. 3 is a photograph of natural untreated soil clods during wetting.
Figure 6:
FIG. 6 is a photograph of the clods of FIG. 4 after drying.
Figure 5:
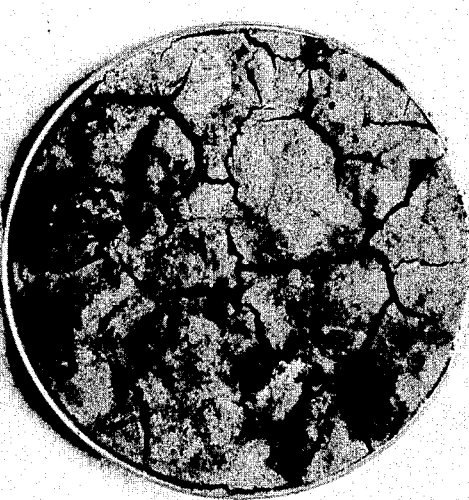
FIG. 5 is a photograph of the clods of FIG. 3 after drying.

This effect is illustrated in FIGS. 3-6 wherein FIG. 3 illustrates natural (hydrophilic) clods and FIG. 4 illustrates clods treated with sodium methyl siliconate in accordance with the invention, before wetting. Thus, the unstable natural clods of FIG. 3 imbibe water and slake down to a muddy suspension, while the treated clods remain discrete and stable. Upon drying, as shown in FIG. 5, the natural clods form a dense crust, while the treated clods, FIG. 6, still remain discrete and stable.

Rain water reaching hydrophobic clods trickles off each clod and flows downward through the open spaces, thus penetrating directly into the deeper soil layers. The by-passed clods themselves remain dry even while the cloddy layer as a whole conducts water.

The resistance of individual treated clods to wetting is shown in FIG. 7. The consequent increase in stability of these clods is also demonstrated in FIGS. 3-6. The effect of a surface layer of water-repellent clods on infiltration is shown in FIG. 8. The latter effect obviously depends on the sizes of the clods, which in turn determine the configuration of pores at the soil surface. If the aggregates are too small, the inter-aggregate passages may act as capillaries which resist penetration of water and thus reduce infiltration. Experience indicates that the minimum dimensions of clods should be greater than 5 mm and the maximum dimensions of the clods should be 15 cm or less. Preferably the minimum dimension should be 0.5 cm and the maximum dimension should be 10 cm for the cloddy layer to enhance, rather than retard infiltration, as well as to subsequently retard evaporation.

Should rain intensity nevertheless exceed the soil's maximum absorption rate (i.e., "infiltrability") then the excess can accrue and remain temporarily in the inter-clod cavities of the surface-zone rather than run off, as it would if the soil surface were smooth and devoid of the cloddy mulch. The surface excess water thus stored can eventually infiltrate into the soil after the high-intensity rain has abated. Even if, during a particularly intense downpour, the excess water should exceed the cloddy layer's storage capacity, the runoff which does occur is less likely to disperse particles and scour or erode the surface. These effects has demonstrated in the following Table 1.

TABLE 1

Infiltration, runoff, erosion, and subsequent germination of grass seeds in plots of a silt-loam soil with 6 cm thick top layers of variously treated clods (5-20 mm diameter range). The plots were subjected to a simulated rain of 82.3 mm/hour for 8 hours. 1000 seeds/m$^2$ of Rhodes grass (Chloris guayana) were broadcast on the surface prior to application of the rain, and the germinated seedlings were counted 14 days later.

| Treatment of clods: | Untreated | Silicone-sprayed | Silicone-soaked |
|---|---|---|---|
| Time to onset of runoff (hrs.) | 0.29 | 1.50 | 1.69 |
| Steady-state infiltrability (mm/hr.) | 3.7 | 17.8 | 20.2 |
| Total erosion (gm sediment/m$^2$) | 789 | 32 | 8 |
| Subsequent germination (seedlings/m$^2$) | 162 | 8 | 6 |

The effect of clod hydrophobization becomes even more important during the dry spells which generally follow rainfall events in semi-arid and arid regions. The evaporation phase normally begins when the soil top layer is in a state of near-saturation, no radiation and wind can extract a considerable fraction of moisture contributed by the preceding rain. On the other hand, when a top layer of water-repellent dry clods is present, capillary conduction from the underlying moist soil is inhibited. The dry mulch constitutes a barrier through which soil moisture can escape by the relatively slow process of vapor diffusion. Ancient farmers made use of this phenomenon by gravel-mulching around this grapevines, a practice which would be prohibitive in cost today.

The relation between evaporation and the characteristics of a cold mulch is shown in FIG. 9. It is seen that the presence of a top layer of hydrophobic clods consistently reduces evaporation in comparison with the non-cloddy control, as well as in comparison with untreated clod layers. The extent of this reduction varies with the depth of the cloddy layer, and is affected by the size-range of the clods. As the clods are made layer, the conductivity of the layer to liquid water falls off more and more steeply with increasing soil moisture suction during the drainage and evaporation phases. However, beyond a certain point any further increase in clod sizes entails an increase in the vapor diffusivity of the layer, especially as the overly-large inter-clod cavities permit the entry of convective currents resulting from wing gusts.

In addition to runoff and direct evaporation, a major cause of water loss and poor yeilds is the infestation of weeds, which compete with crop plants for nutrients, space, and light, as well as for soil moisture. Hydrophobization of top layer clods can inhibit, and in some cases effectively prevent, germination of weed seeds in the soil surface zone, since this layer remains dry through repeated cycles of rain and shine. On the other hand, germination of crop seeds can be ensured by a method of planting which cuts a furrow through the top layer and inserts the seeds into underlying moist soil. Weed seedling counts carried out in small field plots are shown in Table 1.

Waterproofing surface-zone clods can be regarded as a treatment aimed at enhancing the natural "self-mulching" tendency of the soil, a process by which a drying soil breaks into clods which inhibit evaporation and promote infiltration of subsequent rains, and which makes it possible for a natural soil to absorb in a few hours a quantity of water which it later retains against evaporation for many days or weeks. The concept of modifying or tailoring the soil to perform more efficiently as a medium for crop production is well known. The use of chemical agents in this effort was begun many years ago. For example, some 20 years ago "soil conditioners" were introduced which were mainly synthetic polymers designed to glue soil particles together so as to form waterstable clods. The basic cost of these materials, the quantities required, and the expense of application, combined to pevent "soil conditioning" from becoming a practical method of soil management.

The present invention achieves the effect of water stability without gluing the clods internally but merely by making the outer particles water repellent by a small amount of a surface-active hydrophobic agent. A number of materials of the organo-silicone type have been tried, and it has been found that the amount of active material, while depending on the soil's specific surface, is generally very small, being of the order of 10–50 kg per hectare. Since only monomolecular adsorption is required in principle to transform mineral particle surfaces from a hydrophilic to a hydrophobic state, the desired effect can be achieved by a thin spraying over the peripheries of the clods without total impregnation. The small amount of material applied and the strength with which it is adsorbed to the soil grains prevent any appreciable toxic or environmentally damaging effects from occurring. Repeated wetting, drying, heating, cooling, radiation, and the inevitable mechanical disturbance and biological activity which take place in the field eventually bring about degradation of the treatment effect. Soil clod hydrophobization with hydrophobic agents such as silicones have been found to persist for a full agricultural season.

Experimental tests have demonstrated the critical importance of clod sizes and mulch thickness. Increasing the depth of the cloddy mulch increases the beneficial effect on infiltration and evaporation, but is subject to the economic principle of diminishing returns, and hence, mulch thickness greater than 15 cm has not been found to be practical in general.

FIG. 10 illustrates the water balance components of soil profile as a function of different thickness of a mulch formed of silicone treated clods in accordance with the invention.

FIG. 11 presents the water content distribution profiles at the end of a 4-day simulation period (including two rainstorms and four evaporation cycles) for several surface conditions. The silicone treated mulch is seen to increase the depth of water penetration, the average water content, and, in particular, the water content of the surface zone. The latter effect is especially important during the crucial stages of germination, seedling establishment, and the early growth of a crop in dryland farming.

In the characteristics illustrated, the silicone-treated clods were formed and coated in accordance with the invention.

The process in accordance with the invention may be employed to treat an entire area, such as a field, prior to planting. In this case, furrows or holes may be later made in the treated mulch for the planting of seeds. The invention may also be employed to prevent the crusting of soil over seeds. Thus, seeds may be planted in slits formed in the soil, allowing some of the soil to fall into the slits to cover the seeds as in conventional practice. The top of the soil may then be sprayed with a hydrophobic agent in accordance with the invention, whereby the formation of crusts over the seeds is inhibited.

FIGS. 12 and 13 are simplified side and top views of a cold mulcher which may be employed to practice the process of the invention. In this arrangement, a housing 50 is provided, the housing 50 being illustrated in dash lines in FIG. 12 in order to more clearly show the internal components thereof. The housing 50 has side walls 51, a front end wall 52, a rear end wall 53, and a top wall 54. The bottom of the housing 50 is open.

A pair of support wheels 55 is provided and the front and back ends of the housing, the wheels being mounted shafts 56 which are rotatably mounted in bearings 57 in the side walls of the housing. A sprocket 58 is provided on the inner end of each shaft 56, within the housing 50, and a pair of chains 59 extends around each pair of longitudinally-arranged sprockets. The shafts 56 thus define a pair of horizontal axes, and the shafts are driven upon the pulling of the cold mulcher, for example, by a tractor, so that the continuous chains 59 continually move around the axes defined by the shafts 56.

A plurality of horizontal spaced-apart parallel bars 60 extend between the two conveyor chains 59, and longitudinally-extending wires 61 may be provided, loosely interconnecting the rods or bars 60, whereby the structure of rods and wires 60, 61 forms a screen that is movable between the axes defined by shafts 56 with the conveyor chains 59. The bars 60 and wires 61 are spaced apart a sufficient distance to prevent passing therethrough of the clods greater than those desired. For example, the spacing between adjacent rods and between adjacent wires is preferably greater than 5 millimeters and less than 15 centimeters, although obviously an intermediate spacing is preferred. The relative spacings of the bars and the wires may be adjusted, by conventional means (these are not shown) in order to adapt the clod mulcher in accordance with the invention for different types of soils.

In FIG. 12 it will be particularly noted that the axis of the rear sprockets 58 is eccentric with respect to the axis of the corresponding shafts 56. This eccentricity effects vertical vibration of the screen assembly, as well as transverse vibration of the screen assembly, during moving of the clod mulcher. The vibration aids in breaking up of clods of soil on the moving screen.

A further endless conveyor belt 65 is mounted to the housing, to extend forwardly and downwardly from the housing, and an adjustable blade 66 is mounted forwardly of the conveyor belt 65, so that it may extend to the ground in order to direct soil from a layer of the ground to the conveyor belt 65. The mounting of the blade, may be effected by any conventional means, such as by means of the mounting bars 67 extending forwardly of the housing 50. The endless conveyor belt 65 may be positioned to rotate between the rear roller 69, rotatably mounted in the housing, and a forward roller 70, which may be rotatably mounted, for example, to the arms 67. The endless conveyor 65 may have ridges or pockets 72, so that this conveyor may more easily transport soil from the rear end of the blade 66 to the top of the screen formed by the rods 60 and wires 61, this screen being generally indicated by the numeral 75.

An engine 76 may be mounted on top of the housing 50, and coupled to the conveyor belt 65, for example, by an endless belt 77, to enable the movement of the endless conveyor belt 65.

A draw bar 80 may be conventionally mounted to the forward region of the housing, in order to enable drawing of the clod mulcher, for example, by means of a tractor.

A plurality of nozzles 81 are provided in the housing, for directing liquid spray or powder agents within the housing. These nozzles may be conventional, and are connected by way of a conduit 86 to a tank 87, the tank 87 preferably being mounted on the tractor, in order to reduce the weight that must be carried by the clod mulcher. The tank 87 may be thus provided with a suitable liquid or powdered hydrophobic agent, the agent being pumped through the conduit 86 to the nozzle 81, for dispersal throughout the interior of the housing.

Conventional pump means and a tank assembly may be employed for this purpose.

As illustrated particularly in FIG. 12, the clod mulcher is positioned so that the blade 66 digs into the soil and lifts up a top layer 89 of soil, partially breaking the soil at this point. As the clod mulcher is drawn forward, this lifted soil is carried to the conveyor 65, and thence to the top course of the screen 75. The movement of the soil in this manner is continually breaking up the soil, and as the soil reaches the top course of the screen 75, it is further broken up by the continuous movement of the screen between the axes of the shafts 56, as well as the horizontal and vertical vibrating movement of the rear sprockets, so that the soil is broken up into clods in accordance with the above discussed process, the clods falling through the upper course of the screen, and being further screened in the lower course of the screen 75, and finally falling to the ground for deposition thereof as a top layer of soil.

In order to aid in the breaking up of the soil, the flexible finger assembly 90 is affixed inside of the housing to the top of the housing, the fingers of this assembly extending downwardly and rearwardly. The fingers provide a downward force on the soil, to thereby further aid in the breaking up of the soil into the desired clods.

It will be apparent that the nozzles in the housing are spaced apart to provide a desired uniform spray or dusting of particles within the housing. The fingers 90 act as rakes to inhibit as much as possible the falling or clods larger than those desired off the rear end of the screen and back to the top layer of soil. Thus, FIG. 12 illustrates the treated clods 92 after they have been redeposited on the field, to form a mulch layer in accordance with the desired thickness. The thickness of the layer may of course be controlled, for example, by adjustment of the blade 66, to thereby adjust the thickness of the layer 89 which is stripped from the top of the soil.

The present invention is further illustrated by the following Table of Examples which includes a preferred embodiment. Unless otherwise indicated, all parts and percentages are by weight. The region to which these examples pertain is the northern Negev region of Israel. The climate is semi-arid. Seasonal rainfall is 310 mm between late November and late April. The soil is a silt loam. The soil top layer was formed into clods by hand hoeing and sprayed by hand while being thoroughly mixed with 5% solution of sodium methyl siliconate in petroleum distillates. Active sodium methyl siliconate was applied at the rate of 20 liters per 1000 m² of field surface. The soil surface was air dried at the time of treatment (water content less than 2%). The control is untreated soil top layer.

While the invention has been disclosed and described with reference to a limited number of embodiments, it will be apparent that many variations and modifications may be made therein within the invention, and it is intended in the following claims to cover each such variation and modification as falls within the true spirit and scope of the invention.

What is claimed is:

1. A process of conserving soil moisture in arid and semi-arid regions comprising the steps of:
   a. forming the top soil said regions into a layer of independent clods, said layer having a depth in the range of 2 to 15 centimeters, at least 90% of the mass of said layer being clods ranging in size from 5 millimeters in minimum dimension to ten centimeters in maximum dimension;
   b. coating the exposed grain surfaces of each clod with a hydrophobic agent to increase the contact angle of water on the grain surface to an angle greater than 90°.

2. The process of claim 1 wherein the step of forming the top soil comprises forming said layer with at least 90% of the mass thereof having clods ranging in size from a minimum dimension of half a centimeter and a maximum of 10 centimeters.

3. The process of claim 1 wherein the steps of coating comprises penetrating said hydrophobic agent into the periphery of each clod at least 1 millimeter.

4. The process of claim 1 wherein said step of coating comprises spraying a liquid hydrophobic agent on said clods in a chamber.

5. The process of claim 1 wherein said step of coating comprises dusting a powdered hydrophobic agent on said clods.

6. The process of claim 1 wherein said step of forming comprises agitating said top soil on a screen whereby said clods drop through said screen to form said layer, and wherein said step of coating comprises spraying said dropping clods with a liquid hydrophobic agent.

7. The process of claim 1 wherein said step of coating comprises coating said clods with a silicone.

8. The process of claim 1 wherein said hydrophobic agent is an aqueous solution.

9. The process of claim 1 wherein said hydrophobic agent is an aqueous emulsion.

10. The process of claim 1 wherein said hydrophobic agent is a solution of a hydrophobic material in an organic solvent.

11. The process of claim 1 where said hydrophobic agent is an emulsion of a hydrophobic material.

12. The process of claim 1, wherein said step of coating comprises coating said clods with a monomolecular layer of said hydrophobic agent.

13. The process of claim 1, wherein said step of coating comprises coating said exposed grain surfaces of said clods without filling the micropores of said clods.

TABLE OF EXAMPLES

| Example No. | Depth of Clod Layer (cm) | Range of Clod Sizes for 90% of Soil (cm) | Total Rainfall (mm) | Total Runoff (mm) | Total Evaporation (mm) | Water Available At Season's End (mm) | Seedling Counts (per m²) |
|---|---|---|---|---|---|---|---|
| (1) | 2 | .5–2 | 310 | 24 | 68 | 218 | 18 |
| (2) | 15 | 4–10 | 310 | 11 | 52 | 247 | 0 |
| (3) (Preferred Embodiment) | 5 | 1–5 | 310 | 18 | 28 | 264 | 4 |
| Control | | | 310 | 62 | 178 | 60 | 88 |

14. The process of claim 1, further comprising adding an additional material to said hydrophobic agent whereby the micropores of said clods are filled by said step of coating said exposed grain surfaces of each clod with a hydrophobic 15. The process of claim 1, wherein said step of coating comprises coating said clods with a hydrophobic agent selected from the group consisting of sodium methyl siliconate, silanolate, dimethyl siliconate, silane and dimethyl siloxane.

16. The process of claim 1, wherein said step of coating comprises coating said clods with a concrete waterproofing agent.

17. A process of conserving soil moisture in arid and semi-arid regions comprising the steps of:
a. lifting a portion of soil said regions from the top layer of soil in a field;
b. forming said lifted soil into clods at least 90% of the mass of which is clods ranging in size from 5 millimeters in minimum dimension to 10 centimeters in maximum dimension;
c. coating the exposed grain surfaces of each clod by monomolecular adsorption with a hydrophobic agent to increase the contact angle of water on the grain surface to an angle greater than 90°; and
d. depositing said coated clods in said field to a depth of 2 to 15 centimeters.

* * * * *